US005106826A

United States Patent [19]

Alford et al.

[11] Patent Number: 5,106,826

[45] Date of Patent: Apr. 21, 1992

[54] SYSTEM FOR TRANSMITTING AND/OR RECEIVING ELECTROMAGNETIC RADIATION EMPLOYING RESONANT CAVITY INCLUDING HIGH $T_c$ SUPERCONDUCTING MATERIAL

[75] Inventors: Neil M. Alford, Upton-By-Chester, United Kingdom; George E. Peterson, Warren; Robert P. Stawicki, Brick, both of N.J.

[73] Assignee: AT&T Bell Laboratories, Murray Hill, N.J.

[21] Appl. No.: 384,592

[22] Filed: Jul. 24, 1989

[51] Int. Cl.[5] .......................... H04B 1/02; H04B 1/18

[52] U.S. Cl. .......................................... 505/1; 505/700; 505/739; 333/99 S; 455/325; 455/281; 455/129

[58] Field of Search .................. 333/99 S; 505/1, 701, 505/702, 700, 739, 866; 455/129, 281, 282, 325

[56] References Cited

U.S. PATENT DOCUMENTS

| | | | |
|---|---|---|---|
| 2,773,244 | 12/1956 | Grieg | 455/281 X |
| 3,056,092 | 9/1962 | Cook et al. | 333/227 X |
| 3,564,546 | 2/1971 | Barney et al. | 333/99 S X |
| 4,677,082 | 6/1987 | Alford et al. | 501/88 |
| 4,820,688 | 4/1989 | Jasper, Jr. | 505/1 |
| 4,918,049 | 4/1990 | Cohn et al. | 333/227 |
| 4,971,946 | 11/1990 | Taylor et al. | 505/1 |
| 4,999,336 | 3/1991 | Nadkorni et al. | 505/1 |

FOREIGN PATENT DOCUMENTS

| | | |
|---|---|---|
| 0288208 | 4/1988 | European Pat. Off. . |
| 0309169 | 9/1988 | European Pat. Off. . |

OTHER PUBLICATIONS

Braginski, A. I. et al., "Prospects for Thin-Film Electronic Devices of High-$T_c$ Superconductors", 5th Int'l Workshop on Future Electron Devices; Jun. 2-4, 1988; pp. 171-179.

Zanopoulos, C. et al., "Performance of a Fully Superconducting Microwave Cavity Made of High $T_c$ Superconductor $Y_1Ba_2Cu_3Oy$"; *Appl. Phys. Lett.;* 52(25), Jun. 20, 1988; pp. 2168-2170.

Delayen, J. R. et al., "Of Properties of an Oxide Superconductor Half-Wave Resonant Line"; *Appl. Phys. Lett.;* vol. 52, No. 11, Mar. 14, 1988; pp. 930-932.

Peterson, G. E. et al., "Coaxial Lines and Cavities Containing High $T_c$ Superconducting Center Conductors", *Proc. IEEE Princeton,* Section Sarnoff Symposium, Sep. 30, 1988.

*Primary Examiner*—Eugene R. LaRoche
*Assistant Examiner*—Benny T. Lee
*Attorney, Agent, or Firm*—Bernard Tiegerman; Glen E. Books

[57] ABSTRACT

Systems for transmitting and/or receiving electromagnetic signal radiation are disclosed. The inventive systems are distinguished from previous such systems in that each includes at least one resonant cavity comprising a housing containing a body, e.g., a cylindrical or helical body, of relatively high $T_c$ superconducting material. Significantly, this body is fabricated using a new, unconventional procedure. As a result, the body exhibits substantially lower surface resistances than either previous such bodies of relatively high $T_c$ superconducting material, fabricated using conventional procedures, or bodies of copper, at 77 Kelvins and at frequencies ranging from about 10 MHz to about 2000 MHz. Moreover, as a consequence, the resonant cavity containing the unconventionally fabricated body exhibits much higher quality factors, Q, at the above temperature and frequencies, than previous such cavities containing either conventionally fabricated bodies of relatively high $T_c$ superconducting material, or bodies of copper.

9 Claims, 4 Drawing Sheets

10

70

SYSTEM FOR TRANSMITTING AND/OR RECEIVING ELECTROMAGNETIC RADIATION EMPLOYING RESONANT CAVITY INCLUDING HIGH $T_c$ SUPERCONDUCTING MATERIAL

BACKGROUND OF THE INVENTION

1. Field of the Invention

The invention pertains to systems for transmitting and/or receiving electromagnetic signal radiation, which systems include electromagnetic cavity resonators.

2. Art Background

Electromagnetic cavity resonators, also called resonant cavities, are devices which include cavities (chambers) enclosed by electrically conductive walls. The geometries and dimensions of these cavities are chosen so that particular electromagnetic waves, having specific frequencies/wavelengths, resonate within the cavities, i.e., undergo reflections from the walls of the cavities to produce standing wave oscillations.

A resonant cavity having a configuration which (as discussed below) is of particular relevance to the present disclosure is the resonant cavity depicted in FIG. 1. As shown, this resonant cavity includes an outer cylindrical wall and an inner, coaxial, solid cylinder, both of which are, for example, of copper, and both of which are, for example, circular in cross-section (as depicted). For an electromagnetic wave propagating parallel to the longitudinal axis of the resonant cavity, having a radial electric field, E, and a circular magnetic field, B, resonance is achieved at a wavelength (within the resonant cavity), λ, which is equal to twice the length, L, of the resonant cavity.

A figure of merit useful in characterizing the frequency selectivity of a resonant cavity, i.e., the ability of the cavity to sustain electromagnetic oscillations at frequencies which are slightly off-resonance, is the quality factor, Q, of the cavity. That is, if, hypothetically, one were to insert a vanishingly small electrical wire, producing a minute amount of power dissipation and having a loop on its end, through an opening in an appropriately chosen surface of the cavity, and flow alternating current, at frequencies close to the resonant frequency, through the wire, electromagnetic waves having corresponding frequencies would be produced within the cavity. In this hypothetical scenario, the strengths of the waves within the cavity are inferable by inserting a second vanishingly small wire, also producing a minute amount of power dissipation and also having a loop on its end, into the cavity and measuring the electrical powers associated with the alternating currents induced in the second wire. If one were to plot these electrical powers (associated with the induced currents) versus frequency, f, then a plot like that shown in FIG. 2 would be obtained. As expected, the maximum power occurs at the resonant frequency, fo, with power rapidly decreasing at frequencies off resonance. In this regard, the quality factor, Q, of the resonant cavity (per se) is equal to fo/Δf, where Δf (see FIG. 2) denotes what is conventionally termed full width at half power, i.e., the width of the frequency range over which the electrical powers associated with the induced currents have fallen to one-half the peak power.

Significantly, as is known, the Q of a resonant cavity (per se), and thus the frequency selectivity of the cavity, is equal to 2πfo·W/P, where W denotes the electromagnetic energy stored in the cavity and P denotes the average electrical power dissipated in the walls of the cavity. That is, if the walls of the resonant cavity were perfect electric conductors, i.e., the walls were impenetrable to electric fields and exhibited no electrical resistance, then only the corresponding resonant oscillation could be maintained within the cavity, and therefore Q would be infinite. However, if the walls are imperfect conductors (as is always the case with conventional electric conductors), then the electric field associated with a slightly off-resonant oscillation will penetrate the walls (at least slightly) and, as a consequence, it now becomes possible for the off-resonant oscillation to be maintained. Such penetration will induce currents in the walls which will serve to expel the field and preclude electromagnetic energy accumulation within the cavity at the off-resonant frequency. However, because the imperfectly conducting walls exhibit electrical resistance, electrical power will be dissipated in the walls, and therefore the currents will be less than are needed to expel the field. Consequently, the off-resonant oscillation will be maintained, to the degree that power is dissipated in the walls (and provided the dissipated power is replenished). Thus, it is power dissipation which accounts for the presence of off-resonant oscillations and finite Qs.

As is known, the intensity of an alternating electric field within a normal (conventional) electric conductor decays exponentially with depth, and the particular depth at which the field decays to 1/e of its maximum value where e is the base of natural logarithms having the approximate value 2.71828, is called the skin depth. As is also known, essentially all the power dissipation, described above, occurs within the skin depth, and it is the corresponding electrical resistance, called the surface resistance (the real component of the surface impedance), which is responsible for this power dissipation. In this regard, it can be shown that the Q of a resonant cavity is inversely proportional to the surface resistance of the cavity. In particular, in the case of the coaxial resonant cavity depicted in FIG. 1, it can be shown that the Q of the cavity is approximately equal to $$Q \approx \frac{Z_o}{R_a/a^2 + R_b/b^2}, \tag{1}$$

where a and b are the radii, and $R_a$ and $R_b$ are the corresponding surface resistances, of, respectively, the inner solid cylinder and the outer cylindrical wall, and $Z_o$ is the real component of a characteristic impedance of the resonant cavity. If, for example, $R_a/a^2$ is substantially larger than $R_b/b^2$, then the Q of the cavity is approximately equal to $$Q \approx \frac{a^2 Z_o}{R_a}. \tag{2}$$

Significantly, resonant cavities exhibiting relatively high Qs are employed as narrow bandpass filters in systems for transmitting and/or receiving radio-frequency and microwave-frequency electromagnetic signal radiation, such as cellular radio systems. In this regard, as is known, the frequency spacing between adjacent signal channels in cellular radio systems is limited by the Qs of currently available resonant cavities. That is, smaller frequency spacings, in both present and planned systems, are desirable, indeed, in some cases, essential. However, these smaller frequency spacings can only be achieved by employing resonant cavities which exhibit correspondingly higher Qs. While the Q of a cavity can be increased by increasing the dimensions of the cavity, the Qs needed to achieve significantly smaller frequency spacings are so high that the corresponding cavities would have to be impractically large.

An attempt has been made to achieve higher Qs, without increasing cavity dimensions, by employing a material which was assumed to exhibit a substantially lower surface resistance than conventional materials, such as copper. (See, e.g., Eq.(2), which indicates that a reduction in $R_a$ results in a corresponding increase in Q.) That is, a coaxial resonant cavity, of the type depicted in FIG. 1, has been fabricated, in which the central copper cylinder was replaced by a cylinder which included yttrium barium copper oxide ($YBa_2Cu_3O_7$), one of a newly discovered class of superconducting cuprates, i.e., cuprates which exhibit zero electrical resistance to DC electrical current. In this regard, the $YBa_2Cu_3O_7$ cylinder was fabricated, conventionally, by initially forming a mixture of precursors of the superconducting material, i.e., copper oxide, barium carbonate and yttrium oxide. This mixture was ground, using a ball mill, into a powder in which the powder particles were typically 40 micrometers ($\mu m$) in size. The powder was then mixed with a few drops of deionized water to form a paste, which was placed in a mold and subjected to a pressure of 40,000 pounds per square inch (psi). After being removed from the mold, the resulting body was sintered (heated) in an oxygen atmosphere at 900 degrees Centrigrade (C.) for four hours, which served to convert the precursor materials to $YBa_2Cu_3O_7$, and then annealed in an oxygen atmosphere at a temperature which was reduced from 500 degrees C. to room temperature at a rate of 1 degree C. per minute. (Regarding this conventional processing see G. E. Peterson et al, "Coaxial Lines and Cavities Containing High $T_c$ Superconducting Center Conductors," *Proc. IEEE Princeton Section Sarnoff Symposium*, Sept. 30, 1988.)

As is known, the newly discovered superconducting cuprates exhibit relatively high critical temperatures, $T_c$ (the temperature above which the material ceases to be superconducting), i.e., exhibit $T_c$S higher than 77 Kelvins (the boiling point of liquid nitrogen). Significantly, the cylinder of $YBa_2Cu_3O_7$, fabricated using the conventional processing, described above, exhibited a $T_c$ of 90 Kelvins.

Upon immersing the resonant cavity, containing the cylinder of $YBa_2Cu_3O_7$, in liquid nitrogen, it was hoped that the cavity would exhibit a substantially higher Q (by virtue of a lower surface resistance) than a similar cavity immersed in liquid nitrogen, in which the central cylinder is of copper. While the superconductor-containing cavity did exhibit higher Qs than a corresponding copper-containing cavity, at 77 Kelvins and at frequencies ranging from about 5 to about 50 megahertz (MHz), these Qs were, unfortunately, typically no more than about 50 percent higher (and the corresponding surface resistances were no more than about 33 percent lower), which is less than desired. (Regarding the Qs of the superconductor-containing cavity see G. E. Peterson et al, supra.)

It should be noted that the conventionally fabricated cylinder of $YBa_2Cu_3O_7$, referred to above, not only resulted in disappointingly low Qs at 77 Kelvins, but also proved to be fragile (i.e., exhibited flexural strengths less than about 50 megapascals (MPa)), making handling difficult. Moreover, the conventional methods used to fabricate the cylinder proved incapable of producing $YBa_2Cu_3O_7$ bodies having relatively complicated shapes, e.g., helical shapes, which, as discussed below, is a significant drawback.

Thus, those engaged in developing electromagnetic-radiation transmission and receiving systems have sought, thus far without success, relatively small-sized resonant cavities which exhibit relatively high Qs at a temperature of, for example, 77 Kelvins.

SUMMARY OF THE INVENTION

The invention involves the finding that bodies, e.g., cylinders, of relatively high $T_c$ superconducting material, fabricated using a new, unconventional procedure, exhibit surface resistances, at 77 Kelvins and at frequencies ranging from about 10 MHz to about 2000 MHz (and, possibly, at higher frequencies, not yet explored), which are substantially lower than those exhibited by conventionally fabricated superconducting bodies. In fact, by contrast with the conventionally fabricated superconducting bodies, the surface resistances exhibited by the new, unconventionally fabricated superconducting bodies are equal to or even smaller than about one third, and are typically as small as or even smaller than about one tenth, the surface resistances exhibited by corresponding copper bodies, at the above temperature and frequencies. As a consequence, resonant cavities containing the unconventionally fabricated superconducting bodies exhibit Qs which are equal to or greater than about three times, and typically as high as or even higher than about ten times, the Qs exhibited by identical resonant cavities containing copper bodies, at the above temperature and frequencies.

Significantly, it is believed that the relatively low surface resistances exhibited by the unconventionally fabricated superconducting bodies are due to their relatively smooth surfaces. By contrast, conventionally fabricated superconducting bodies exhibit relatively rough surfaces which, presumably, account for their relatively high surface resistances.

Like the conventional fabrication procedure, the new, unconventional fabrication procedure involves the use of particulate materials which are either precursors of the desired superconducting material, or the superconducting material, per se. However, by contrast with the conventional fabrication procedure, to achieve relatively high particle packing densities in the resulting bodies, the particles employed in the unconventional procedure are relatively small, ranging in size from about 0.001 micrometers ($\mu m$) to about 10 $\mu m$. Moreover, in accordance with the unconventional fabrication procedure, these particles are mixed with an organic polymer and an organic liquid solvent for the polymer. Significantly, this mixture is subjected to a relatively high shear stress, i.e., a shear stress of from about 1 MPa to about 20 MPa, to achieve substantially homogeneous mixing of the mixture constituents. In this regard, the organic polymer (discussed more fully below) serves to transmit the applied shear stress to the particles, which breaks up and disperses particle agglomerates. It must be noted that it is the absence of agglomerates which results in bodies with smooth surfaces.

After being subjected to the relatively high shear stress, the resulting mixture has a dough-like consistency, which permits shaping to achieve a desired body shape. The shaped body is initially heated to evaporate the liquid medium and the (dissolved) organic polymer, and is subsequently heated to a higher temperature in an oxygen-containing atmosphere to sinter the particles into a solid body and, if necessary, convert the precursor materials to superconducting material.

Significantly, by contrast with the conventional fabrication procedure, the new unconventional fabrication procedure yields superconducting bodies which are relatively strong, i.e., exhibit flexural strengths equal to or greater than about 50 MPa, and even as high as about 200 MPa. Moreover, the unconventional fabrication procedure is capable of yielding bodies having relatively complicated shapes, e.g., helical shapes.

BRIEF DESCRIPTION OF THE DRAWING(S)

The invention is described with reference to the accompanying drawings, wherein.

DETAILED DESCRIPTION

The invention encompasses systems for transmitting and/or receiving electromagnetic signal radiation, such as cellular radio systems. Significantly, the inventive systems include inventive resonant cavities containing bodies including high $T_c$ superconducting material, which bodies exhibit surface resistances, at 77 Kelvins and at frequencies ranging from about 10 MHz to about 2000 MHz, equal to or less than about one third, and typically as small as or even smaller than about one tenth, the surface resistances exhibited by equally-sized copper bodies, at the same temperature and frequencies. As a consequence, the inventive resonant cavities exhibit Qs which are equal to or larger than about three times, and typically as high as or even higher than about ten times, the corresponding Qs exhibited by resonant cavities containing copper bodies, at the above temperature and frequencies.

Figure 1:
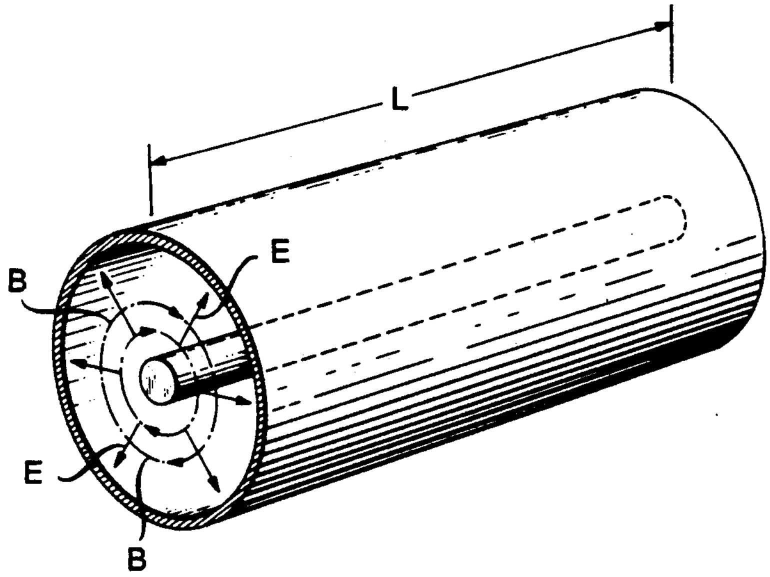
FIG. 1 is a perspective view of a conventional, coaxial resonant cavity.
Figure 2:
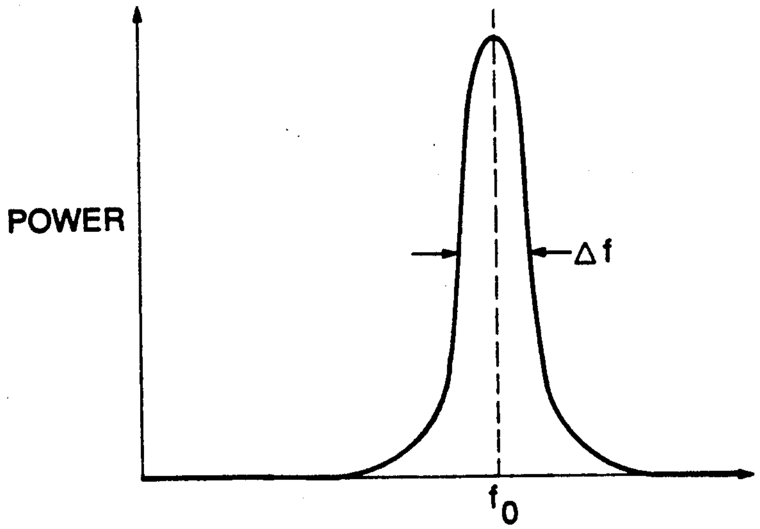
FIG. 2 is a hypothetical plot of electrical power coupled out of a resonant cavity versus the frequency of the electrical power, and thus of the electromagnetic waves, coupled into the cavity, which serves to define the quality factor, Q, of the cavity.
Figure 3:
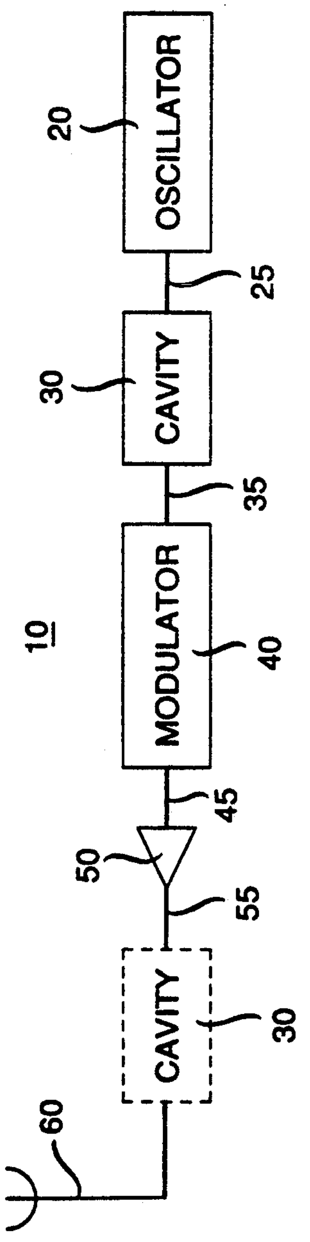
FIGS. 3 and 4 depict, respectively, a system for transmitting, and a system for detecting, electromagnetic signal radiation, encompassed by the present invention.

Significantly, all the systems encompassed by the present invention invariably include an antenna 60, for transmitting and/or receiving electromagnetic signal radiation, and at least one inventive resonant cavity 30 (containing a body including high $T_c$ superconducting material), which communicates with the antenna 60 via one or more electromagnetic waveguides, such as coaxial cables or striplines. For example, as depicted in FIG. 3, a system 10 for transmitting electromagnetic signal radiation, encompassed by the present invention, includes an oscillator 20, inventive resonant cavity 30, a modulator 40 (e.g., a single sideband, double sideband or digital modulator), a power amplifier 50 and an antenna 60, all linked by electromagnetic waveguides. In use, the output of oscillator 20 is communicated via electromagnetic waveguide 25 to resonant cavity 30, which serves to impose frequency selectivity, and thus frequency stability, upon the output of the oscillator. The output of the resonant cavity 30 is communicated via electromagnetic waveguide 35 to modulator 40, the output of which contains the signal information of interest. The output of modulator 40 is communicated via electromagnetic waveguide 45 to power amplifier 50, and the output of power amplifier 50 is communicated via electromagnetic waveguide 55 to antenna 60, which radiates the amplified signals emanating from amplifier 50. While not essential to the system 10, an additional resonant cavity 30 (depicted using dotted lines) may be positioned between the power amplifier 55 and antenna 60 to impose additional frequency selectivity on the signals to be radiated by the antenna.

Figure 4:
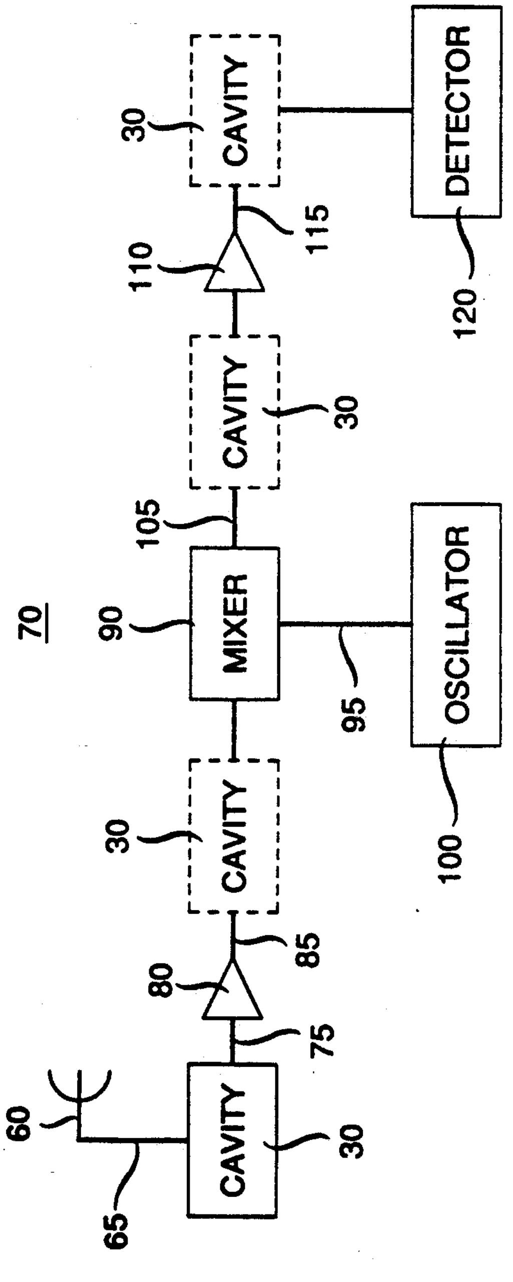

As depicted in FIG. 4, a system 70 for detecting electromagnetic signal radiation, employing the superheterodyne principle, encompassed by the present invention, includes antenna 60, inventive resonant cavity 30 and a low level (small signal) amplifier 80, e.g., a radio-frequency (RF) low level amplifier. This system also includes mixer 90, oscillator 100, amplifier 110, e.g., an intermediate frequency (IF) amplifier, and detector 120 (e.g., a single sideband, FM, AM or digital detector). In use, electromagnetic signal radiation received by antenna 60 is communicated via electromagnetic waveguide 65 to inventive resonant cavity 30 which, in effect, filters out all frequencies except the resonant frequency (and the frequencies very close to the resonant frequency) of the cavity. The output of resonant cavity 30 is communicated via waveguide 75 to low level amplifier 80, the signals amplified by the amplifier 80 being communicated via electromagnetic waveguide 85 to mixer 90. The signal produced by oscillator 100 is communicated via electromagnetic waveguide 95 to mixer 90, where this signal is combined with (beat against) the amplified signal emanating from amplifier 80. One of the resulting signals, i.e., the relatively low frequency signal, is then communicated via electromagnetic waveguide 105 to amplifier 110, the output of which is communicated via electromagnetic waveguide 115 to detector 120. As shown, additional resonant cavities 30 (depicted using dotted lines) may be interposed between the various components of the system 70 to achieve enhanced frequency selectivity.

Figure 5:
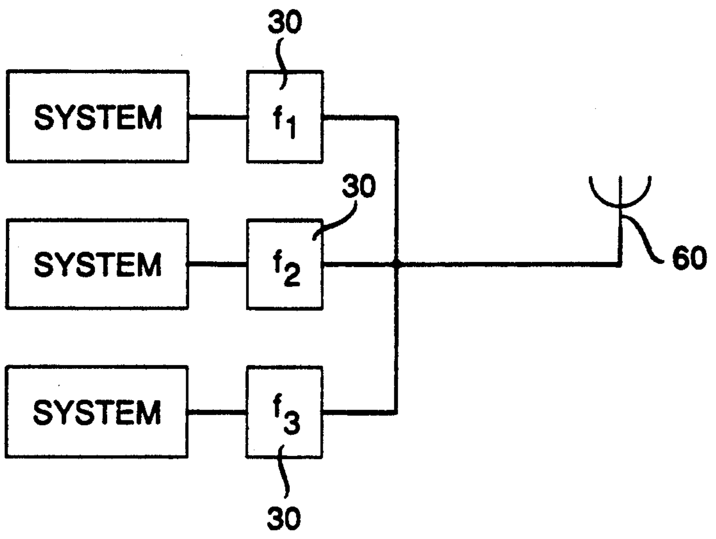
FIGS. 5 and 6 depict, respectively, a combiner, and a duplexer, encompassed by the present invention.

The invention also encompasses various combinations of transmission and detection systems. One such combination is, for example, what is conventionally termed a combiner (see FIG. 5), i.e., a system including two or more transmission systems, or two or more detection systems, connected via electromagnetic waveguides so that all the systems employ but a single antenna 60 for transmitting, or receiving, electromagnetic signal radiation. By contrast with conventional combiners, each of the systems in the combiner of the present invention includes, in addition to, or as one of, its components, an inventive resonant cavity 30, interposed between the system and both the other systems and the single antenna 60. Because, in accordance with the invention, each inventive resonant cavity 30 is tuned to a different resonant frequency, i.e., $f_1$, $f_2$, $f_3$, etc., each cavity serves as a particularly efficacious narrow bandpass filter, blocking signals at other frequencies from being communicated to the corresponding system.

Figure 6:
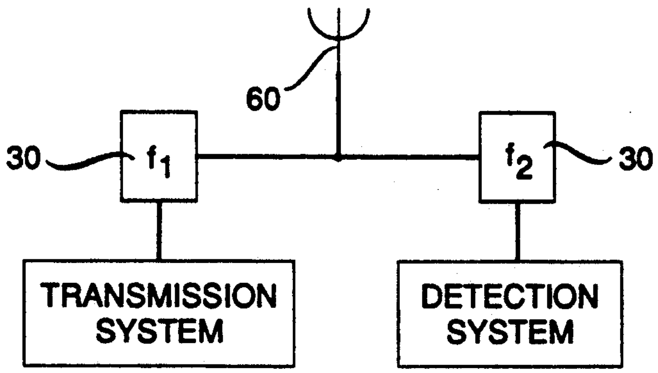

Yet another combination of systems encompassed by the present invention is what is conventionally termed a duplexer (see FIG. 6), in which a transmission system and a detection system are connected via electromagnetic waveguides so that both systems employ the same antenna 60 for transmitting and receiving electromagnetic radiation. As before, an inventive resonant cavity 30 (if not already present in the system) is interposed between each system and the antenna 60, for the reason given above.

Figure 7:
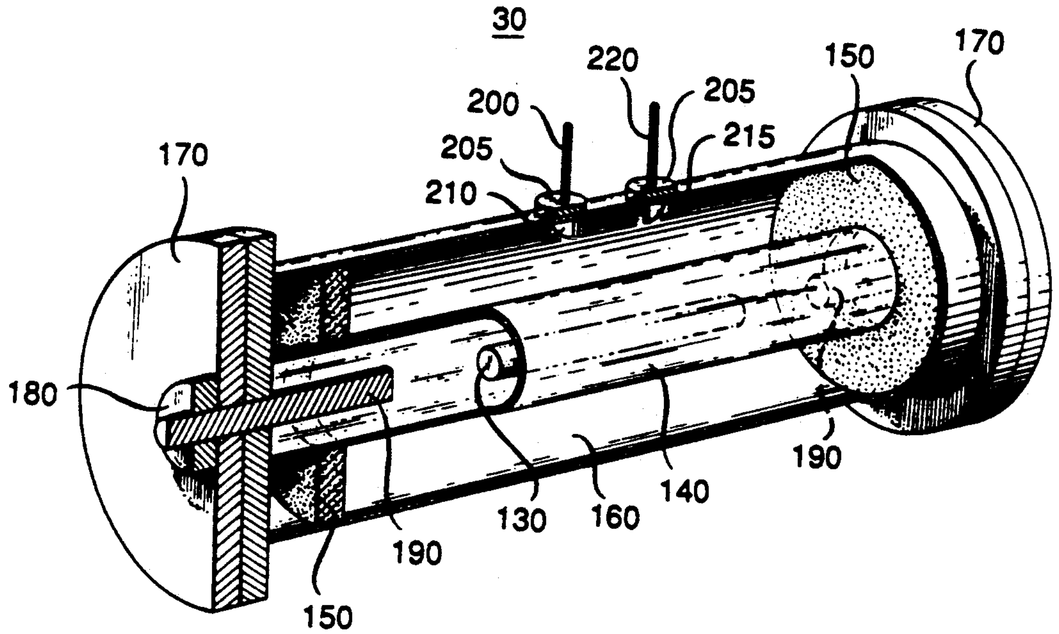
FIGS. 7 and 8 depict first and second embodiments of the inventive resonant cavity encompassed by the present invention.

With reference to FIG. 7, a first embodiment of the inventive resonant cavity 30, useful in the above systems, includes a body 130, e.g., a cylinder, of relatively high $T_c$ superconducting material, which is fabricated using the new, unconventional procedure, described below. A cross-sectional dimension, e.g., radius, of the body 130 should be equal to or greater than about 0.1 millimeter (mm). Cross-sectional dimensions smaller than about 0.1 mm are undesirable because the corresponding bodies would, in practice, carry currents which exceed the corresponding critical currents of the bodies, resulting in a loss of superconductivity. In addition, the superconducting material is, for example, yttrium barium copper oxide. However, any of the recently discovered, relatively high $T_c$ superconducting materials, such as bismuth strontium calcium copper oxide and thallium barium calcium copper oxide, are also useful.

As shown, the body 130 is contained within a tube 140, e.g., a cylindrical, quartz tube, which extends through two apertures in two cylinders 150 of, for example, styrofoam, serving as support mounts for the tube 140. The body 130 is supported directly on the surface of the containing tube 140 or alternatively by conventional glass wool inserts (not shown) in the containing tube. The tube 140 is, itself, contained within a tube 160, e.g., a cylindrical tube, of electrically conductive material, such as copper, and both tube 140 and tube 160 are filled with an inert, thermally conductive gas, such as nitrogen. (A material is electrically conductive, for purposes of the invention, provided the DC electrical resistivity of the material at, for example, 77 Kelvins is equal to or less than about $10^{-8}$ ohm-meter. In addition, a gas is inert, and thermally conductive, for purposes of the invention, provided the gas does not chemically react with the superconducting material and the thermal conductivity of the gas at, for example, 77 Kelvins is equal to or greater than about one tenth the thermal conductivity of air at 77 Kelvins.) The ends of the tube 160 are sealed using liquid-tight fittings 170 which are, for example, screwed onto the ends of the tube 160.

It should be noted that keeping the body 130 within the inert gas-filled, e.g., nitrogen-filled, tube 140, both before and after the tube 140 is inserted into the tube 160, is necessary to avoid degrading the surface of the body 130. That is, if exposed to air, moisture within the air tends to attack and degrade the surface of the body 130, resulting in a substantial increase in surface resistance.

Significantly, to ensure that, during operation, electrical power dissipation is produced almost entirely by the superconducting body 130 and not by the walls of the tube 160, a cross-sectional dimension of the tube 160 should be equal to or greater than about 1.5, and preferably equal to or greater than about 5, times a corresponding cross-sectional dimension of the body 130. Thus, for example, if the body 130 is a circular cylinder and the tube 160 is a circular ring, then the inner radius of the tube 160 should be at least 1.5, and preferably at least 5, times the radius of the circular cylindrical body 130.

Preferably, the inventive resonant cavity 30 also includes two cylinders 190, projecting through seals 180 and fittings 170, into the interior of tube 140. These cylinders 190 are, for example, of metal, e.g., Cu. By inserting these cylinders more or less deeply into the interior of the resonant cavity 30, the resonant frequency of the cavity is readily tuned, i.e., altered.

As shown in FIG. 7, electromagnetic waves are communicated to, and from, the resonant cavity 30 via, for example, coaxial cables 200 and 220, which are connected to the tube 160 through liquid-tight seals 205. Because the propagation direction of an electromagnetic wave communicated by the cable 200 is necessarily transverse to the longitudinal axis of the resonant cavity, an electrically conductive coupling loop 210 is provided, which serves to couple electromagnetic waves into the cavity with propagation directions parallel to the longitudinal axis. Electromagnetic waves within the resonant cavity are coupled out of the cavity, and into the cable 220, via electrically conductive coupling loop 215.

In operation, the tube 160 is placed in a liquid nitrogen bath, and electromagnetic waves are coupled into and out of the interior of the tube 160 via cables 200 and 220 and coupling loops 210 and 215. Most of the electric current associated with the passage of the electromagnetic waves is carried, and therefore most of the power dissipation is produced, by the superconducting body 130. The corresponding, relatively small amount of heat is transferred from the body 130 to the liquid nitrogen bath via the thermally conductive gas (the temperature of which remains sufficiently high so it does not liquify) and the walls of the tube 160.

It must be emphasized that tube 160 should be sufficiently sealed so that liquid nitrogen does not enter the interior of the tube 160 during operation. Such entry is undesirable because it results in boiling of liquid nitrogen, which adversely affects the operation of the inventive resonant cavity.

Figure 8:
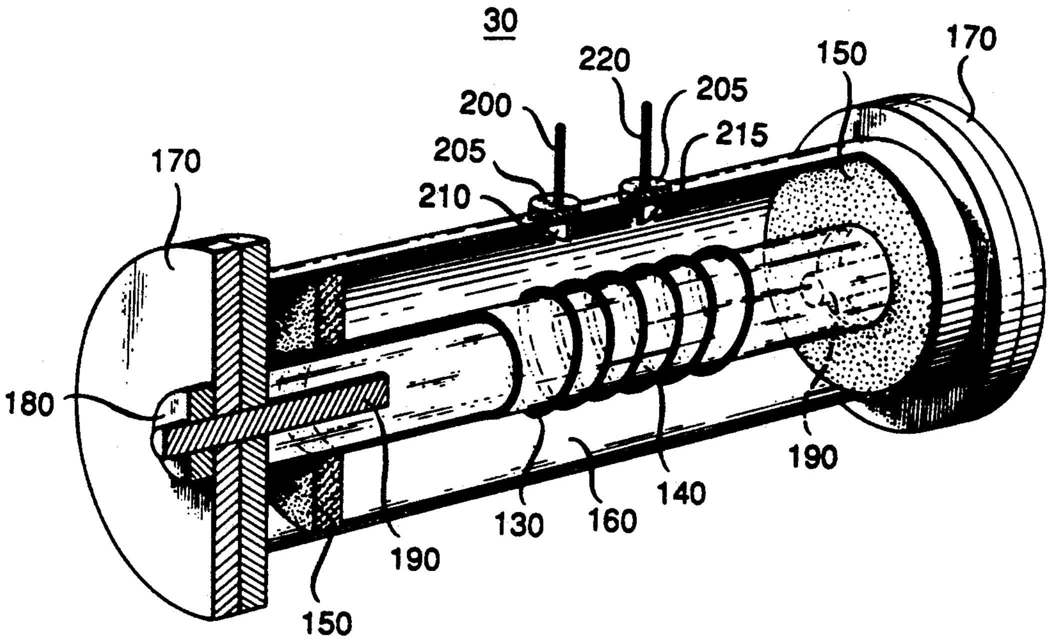

In a second, preferred embodiment of the inventive resonant cavity 30, depicted in FIG. 8, the body 130 is in the form of a helix, which is either placed within, or around, the tube 140. (If not placed within the tube 140, care should be taken to avoid exposing the helical body 130 to air and/or moisture before the body is placed within the inert gas-filled tube 160.) Such a helical configuration is advantageous because, during operation, electromagnetic waves propagate along the helix, and thus the effective propagation length of these waves is approximately equal to the length of the helix, when straightened. Consequently, resonance is readily achieved within the inventive resonant cavity, even for relatively long-wavelength electromagnetic waves, using a tube 160 of relatively short length.

As before, to ensure that power dissipation is largely confined to the helical body 130, a cross-sectional dimension of tube 160 should be equal to or greater than about 1.5, and preferably equal to or greater than about 5, times a corresponding cross-sectional dimension of the body 130. In this instance, the cross-sectional dimension of interest is the radius of the helix, per se. That is, if the helix is placed around the outside of tube 140, then the cross-sectional dimension of interest is equal to the radius of tube 140.

A body 130, including relatively high $T_c$ superconducting material, is produced, in accordance with the invention, by mixing a powder of high $T_c$ superconducting material, or a powder of corresponding precursor materials, e.g., corresponding oxides, nitrates and/or carbonates, with an organic polymer (a solid material) and an organic liquid solvent for the polymer. To achieve a high packing density of superconducting particles in the body 130, the powder particles should have sizes ranging from about 0.001 μm to about 10 μm, with preferably at least 90 percent of the particles having sizes smaller than about 1 μm, and aspect ratios (ratios of length to width) smaller than about 3.0. In addition, the specific surface areas of the particles should range from about 0.5 square meters per gram ($m^2/g$) to about 10 $m^2/g$, and should preferably fall within the range 3–6 $m^2/g$. Powder particles having the desired sizes, aspect ratios and specific surface areas are achievable using conventional mechanical and/or ultrasonic grinding techniques. Powder particles smaller than about 0.001 μm and/or exhibiting specific surface areas larger than about 10 $m^2/g$ are undesirable because such particles tend to absorb an undesirably large amount of fluid, which results in an undesirably small particle packing density in the body 130 which, in turn, results in cracks in the surface of the body 130. On the other hand, powder particles larger than about 10 μm and/or exhibiting specific surface areas smaller than about 0.5 $m^2/g$ are undesirable because such particles require an undesirably high temperature to achieve sintering.

It should be noted that the particulate material constitutes about 30 percent to about 80 percent, and is preferably about 50 percent, by volume, of the particulate/polymer/organic solvent mixture. Particulate amounts less than about 30 percent are undesirable because the corresponding mixtures experience an undesirably large amount of shrinkage and cracking, and are difficult to shape. On the other hand, particulate amounts greater than about 80 percent are undesirable because the corresponding mixtures are undesirably stiff and thus difficult to mix or shape.

As noted above, the organic polymer, when dissolved in an organic liquid medium, serves to transmit an applied shear stress to the particulate material, thereby breaking up and dispersing particulate agglomerates. Those polymers found to be useful are typically long-chained polymers having molecular weights of 100,000 or more. Included among the useful polymers are acetate polymers and copolymers, hydrolyzed acetate polymers and copolymers, acrylate and methacrylate polymers and copolymers, polymers and copolymers of ethylenically unsaturated acids, and vinyl halide polymers and copolymers.

Included among the useful organic liquid solvents are ketones, ethers, e.g., cyclic ethers, and acetates. Specific examples include cyclohexanone, tetrahydrofuran and ethyl acetate.

Included among the useful combinations of organic polymers and organic liquid solvents are the following: methylmethacrylate/dimethylaminoethylmethacrylate copolymer in ethyl acetate; styrene/acrylonitrite copolymer in tetrahydrofuran; vinyl chloride/vinyl acetate/vinyl alcohol copolymer in tetrahydrofuran; vinyl acetate/crotonic acid copolymer in tetrahydrofuran; and vinyl butyral/vinyl alcohol copolymer in cyclohexanone.

The organic polymer constitutes about 5 percent to about 40 percent, and is preferably about 25 percent, by volume of the particulate/polymer/organic solvent mixture. Amounts less than about 5 percent are undesirable because it is difficult to make a cohesive doughy mass out of the corresponding mixtures, i.e., they tend to crumble, and they are difficult to extrude. In addition, amounts greater than about 40 percent are undesirable because the corresponding mixtures are rubbery and difficult to extrude.

The organic liquid solvent also constitutes about 5 percent to about 40 percent, and is preferably about 25 percent, by volume of the particulate/polymer/organic solvent mixture. Amounts less than about 5 percent are undesirable because it is difficult to make a cohesive doughy mass out of the corresponding mixture, i.e., they tend to crumble. In addition, amounts greater than about 40 percent are undesirable because the corresponding mixtures have a runny consistency and don't hold their shape.

After forming the particulate/polymer/organic solvent mixture, the mixture is subjected to a relatively high shear stress, i.e., a shear stress ranging from about 1 MPa to about 20 MPa, and preferably 5 to 10 MPa, to achieve substantially homogeneous mixing of the mixture constituents. Such a shear stress is achieved, for example, by calendering the mixture between a pair of rolls rotating at different peripheral speeds, or by extruding the mixture through a relatively small orifice. The application of this shear stress is significant because it serves to break up and disperse particulate agglomerates, whose presence otherwise results in a body 130 having a relatively rough surface and a relatively high surface resistance.

The particulate/polymer/organic solvent mixture, after being subjected to the relatively high shear stress, typically has a dough-like consistency which makes shaping relatively easy. In this regard, the doughy mixture is readily shaped using any of a variety of conventional shaping techniques, including injection molding and extrusion. For example, the doughy mixture is readily extruded into the shape of a cylinder. Alternatively, a helical body is readily formed by first extruding a long, thin wire, and then winding the wire about a threaded former.

After being shaped, the dough-like mixture is heated to evaporate the organic polymer and organic liquid solvent. Although the heating temperature depends on the nature of the polymer, useful heating temperatures typically range from about 300 to about 500 degrees C.

After removal of the organic polymer and organic liquid solvent, the resulting mass is again heated to sinter the superconducting particles (and/or to initially convert the precursor particles to superconducting particles), thereby forming a unitary body. This sintering step is carried out in an oxygen-containing atmosphere, e.g., air, at a temperature ranging from about 900 degrees C. to about 1000 degrees C., or higher. When sintering is complete, the resulting body is cooled to ambient temperature in an oxygen-containing atmosphere. During this cooling process, the body may also be annealed at a temperature ranging from about 400 degrees C. to about 450 degrees C.

It should be noted that the new, unconventional fabrication procedure, described above, is generally similar to that described in U.S. Pat. No. 4,677,082, issued to N. M. Alford et al on June 30, 1987, which is hereby incorporated by reference.

As noted above, bodies 130, produced in accordance with the invention, exhibit relatively low surface resistances, at 77 Kelvins and at frequencies ranging from about 10 MHz to about 2000 MHz. Consequently, resonant cavities employing such bodies exhibit correspondingly high Qs, at the above temperature and frequencies. In this regard, it must be noted that the Q of the inventive resonant cavity (or of any resonant cavity) cannot be determined simply by coupling different frequency electromagnetic waves into the cavity via a first (necessarily) finite coupling loop, and measuring the electrical powers associated with the alternating currents induced in a second finite coupling loop. That is, the resulting measurement will be affected by the power dissipation produced by the two finite loops. However, it has been found that the Q exhibited by the combination of the cavity and finite coupling loops, here termed $Q_L$, is related to a parameter, T, where $$T = \sqrt{\frac{Po}{Pi}},$$

and where Pi and Po denote the electrical powers associated with the alternating currents flowing in the first and second loops respectively. In addition, it has been found that $Q_L$ varies linearly with T, with $Q_L$ increasing as T decreases. Moreover, the Q of the cavity, per se, is equal to $Q_L$ when T is zero. Thus, for purposes of the invention, the Q of the inventive cavity, per se, or of any cavity, per se, is determined by measuring two different values of $Q_L$ at two different values of T, and then plotting these two data points on a plot of $Q_L$ versus T. (The two different values of T are conveniently achieved by rotating the two coupling loops to two different positions.) By drawing a straight line through the two data points, and extrapolating this straight line through T=0, the Q of the cavity, per se, is readily determined.

Significantly, the unknown surface resistance of a body at, for example, 77 Kelvins (or at any other temperature), is readily determined by, for example, forming identically-shaped bodies having known surface resistances at the temperature of interest, e.g., bodies of copper, silver and gold. By incorporating these bodies of known surface resistances into a resonant cavity, and measuring the corresponding Qs (as described above) at the temperature of interest, a functional relationship between Q and surface resistance is readily obtained. Upon incorporating the body of unknown surface resistance into the same resonant cavity, and measuring the corresponding Q, the corresponding value of surface resistance is then readily inferred from the functional relationship.

We claim:

1. A system for transmitting and/or receiving electromagnetic radiation, comprising:
- an antenna;
- a resonant cavity in electromagnetic communication with said antenna;
- an oscillator, in electromagnetic communication via waveguide means with said resonant cavity; and
- a modulator, in electromagnetic communication via waveguide means with said resonant cavity, characterized in that
- said resonant cavity includes a housing having an interior and a superconductor-containing body within the interior of said housing, said body including material which exhibits superconductivity at a temperature equal to or greater than about 77 Kelvins, said body comprised essentially of packed sintered superconductive particles having sizes smaller than one micrometer whereby said body exhibits a smooth conductive surface and a flexural strength of at least 50 MPa.

2. A system for transmitting and/or receiving electromagnetic radiation, comprising:
- an antenna; and
- a resonant cavity in electromagnetic communication with said antenna, characterized in that,
- said resonant cavity includes a housing having an interior and a superconducting-containing body within the interior of said housing, said body including material which exhibits superconductivity at a temperature equal to or greater than about 77 Kelvins, said body comprised essentially of packed sintered superconductive particles having sizes smaller than one micrometer whereby said body exhibits a smooth conductive surface and a flexural strength of at least 50 MPa, and
- wherein said housing and said superconductor-containing body have respective uniform cross-sections and wherein said housing has a cross-sectional dimension which is equal to or greater than about 1.5 times the cross-sectional dimension of said superconductor-containing body.

3. The system of claim 2 wherein said superconductor-containing body is cylindrical in shape.

4. A system for transmitting and/or receiving electromagnetic radiation, comprising:
- an antenna; and
- a resonant cavity in electromagnetic communication with said antenna, characterized in that,
- said resonant cavity includes a housing having an interior and a superconducting-containing body within the interior of said housing, said body including material which exhibits superconductivity at a temperature equal to or greater than about 77 Kelvins, said body comprised essentially of packed sintered superconductive particles having sizes smaller than one micrometer whereby said body exhibits a smooth conductive surface and a flexural strength of at least 50 MPa, and
- wherein said superconductor-containing body is helical in shape.

5. The system of claim 2 or 4 further comprising:
- a mixer, in electromagnetic communication with said resonant cavity;
- an oscillator, in electromagnetic communication with said mixer; and
- a detector of electromagnetic radiation, in electromagnetic communication with said mixer.

6. The system of claim 2 or 4 or 1 wherein said particles have a specific surface area which falls within the range 3 square meters per gram to 6 square meters per gram.

7. The system of claim 2 or 4 or 1 wherein said surface of said body is free of particulate agglomerates.

8. The system of claim 2 or 4 or 1 wherein at least 90% of said particles have sizes smaller than one micrometer and aspect ratios smaller than about 3.0.

9. The system of claim 2 or 4 or 1 wherein said particles have a specific surface area which falls within the range from 0.5 square meters per gram to 10 square meters per gram.

* * * * *